(12) United States Patent
Lasserre et al.

(10) Patent No.: US 10,964,066 B2
(45) Date of Patent: Mar. 30, 2021

(54) METHOD AND APPARATUS FOR ENCODING A POINT CLOUD REPRESENTING THREE-DIMENSIONAL OBJECTS

(71) Applicant: INTERDIGITAL VC HOLDINGS, INC., Princeton, NJ (US)

(72) Inventors: Sebastien Lasserre, Thorigné Fouillard (FR); Julien Ricard, Plouër-sur-Rance (FR); Yannick Olivier, Thorigné Fouillard (FR)

(73) Assignee: INTERDIGITAL VC HOLDINGS, INC., Wilmington, DE (US)

( * ) Notice: Subject to any disclaimer, the term of this patent is extended or adjusted under 35 U.S.C. 154(b) by 0 days.

(21) Appl. No.: 16/153,719

(22) Filed: Oct. 6, 2018

(65) Prior Publication Data

US 2019/0108654 A1 Apr. 11, 2019

(30) Foreign Application Priority Data

Oct. 6, 2017 (EP) ..................................... 17306352

(51) Int. Cl.
*G06T 9/00* (2006.01)
*G06T 17/00* (2006.01)
*G06T 15/04* (2011.01)
*G06T 15/08* (2011.01)
*G06T 7/50* (2017.01)

(52) U.S. Cl.
CPC ................ *G06T 9/001* (2013.01); *G06T 7/50* (2017.01); *G06T 15/04* (2013.01); *G06T 15/08* (2013.01); *G06T 17/00* (2013.01); *G06T 2207/10024* (2013.01); *G06T 2207/10028* (2013.01)

(58) Field of Classification Search
None
See application file for complete search history.

(56) References Cited

U.S. PATENT DOCUMENTS

| 6,249,592 B1 * | 6/2001 | Fan .......................... H04N 1/56 358/500 |
| 7,003,136 B1 | 2/2006 | Harville |
| 8,836,768 B1 | 9/2014 | Rafii et al. |
| 8,854,433 B1 | 10/2014 | Rafii |

(Continued)

OTHER PUBLICATIONS

Valgma, L., "3D reconstruction using Kinect v2 camera", University of Tartu, Institute of Technology Computer Engineering Curriculum, Bachelor's Thesis, May 20, 2016, pp. 1-42.

(Continued)

*Primary Examiner* — Zhengxi Liu
(74) *Attorney, Agent, or Firm* — Invention Mine LLC

(57) ABSTRACT

A colored three-dimensional point cloud is encoded in at least two depth and texture images. The proposed method and device use inverse project pixels of the first image and inverse project pixels to the second image. When the inverse projecting of a first pixel of the first image and the inverse projecting of a second pixel of the second image refer to a common generated point, that is two 3D points closer to each other than the imprecision due to the encoding and compression of the images, the color value of the pixel of first and second pixels having the lowest local depth variance is attributed to the common generated point.

13 Claims, 4 Drawing Sheets

(56) References Cited

U.S. PATENT DOCUMENTS

| | | | |
|---|---|---|---|
| 10,373,366 B2* | 8/2019 | Forutanpour | G06T 7/20 |
| 2009/0213240 A1* | 8/2009 | Sim | G06T 17/00 |
| | | | 348/222.1 |
| 2013/0100119 A1* | 4/2013 | Evertt | G06K 9/00201 |
| | | | 345/419 |
| 2016/0097858 A1 | 4/2016 | Mundhenk et al. | |

OTHER PUBLICATIONS

Reisner-Kollmann et al., "Consolidation of Multiple Depth Maps", 2011 IEEE International Conference on Computer Vision Workshops (ICCV Workshops), Barcelona, Spain, Nov. 6, 2011; pp. 1120-1126.

Ochotta et al., "Compression of Point-Based 3D Models by Shape-Adaptive Wavelet Coding of Multi-Height Fields", Eurographics Symposium on Point-Based Graphics, Zurich, Switzerland, Jun. 2, 2004, pp. 103-112.

Schelkens, P., "JFEG PLENO—Scope, use cases and requirements Ver.1.3", ISO/IEC JTC 1/SC 29/WG1, Document M71003, 71st Meeting, La Jolla, California, USA, Feb. 22, 2016, pp. 1-18.

Choi et al., "RGB-D Edge Detection and Edge-based Registration", 2013 IEEE/RSJ International Conference on Intelligent Robots and Systems (IROS), Tokyo, Japan, Nov. 3, 2013, pp. 1568-1575.

\* cited by examiner

METHOD AND APPARATUS FOR ENCODING A POINT CLOUD REPRESENTING THREE-DIMENSIONAL OBJECTS

1. REFERENCE TO RELATED EUROPEAN APPLICATION

This application claims priority from European Patent Application No. 17306352.0, entitled "A METHOD AND APPARATUS FOR ENCODING A POINT CLOUD REPRESENTING THREE-DIMENSIONAL OBJECTS", filed on Oct. 6, 2017, the contents of which are hereby incorporated by reference in its entirety.

2. TECHNICAL FIELD

The present principles generally relate to decoding of a point cloud representing three-dimensional (3D) objects. Particularly, but not exclusively, the technical field of the present principles is related to decoding of a texture and depth image data obtained by a projection of the point cloud for representing geometry and color of the point cloud.

3. BACKGROUND

The present section is intended to introduce the reader to various aspects of art, which may be related to various aspects of the present principles that are described and/or claimed below. This discussion is believed to be helpful in providing the reader with background information to facilitate a better understanding of the various aspects of the present principles. Accordingly, it should be understood that these statements are to be read in this light, and not as admissions of prior art.

A point cloud is a set of points usually intended to represent the external surface of a 3D object but also more complex geometries like hair or fur that may not be represented efficiently by other data format like meshes. Each point of a point cloud is often defined by a 3D spatial location (X, Y, and Z coordinates in an orthogonal frame of reference of the 3D space or angles $\rho$, $\varphi$ and distance d in a radial frame of reference of the 3D space) and possibly by other associated attributes such as color, represented in the RGB or YUV color space for example, a transparency, a reflectance, a normal vector, etc. Point clouds may be static or dynamic depending on whether the cloud evolves with respect to time. It should be noticed that in case of a dynamic point cloud, the number of points is not constant but, on the contrary, generally evolves with time. A dynamic point cloud is thus a time-ordered sequence of sets of points.

Virtual Reality (VR) and immersive worlds have become a hot topic recently and foreseen by many as the future of two-dimensional (2D) flat video. The basic idea is to immerse the viewer in an environment all round him by opposition to standard TV where he can only look at the virtual world in front of him. There are several gradations in the immersivity depending on the freedom of the viewer in the environment. Point clouds, especially colored point clouds, are a good format candidate to distribute VR worlds. They may be static or dynamic and are typically of averaged size (a few millions of points at a time).

Well-known approaches project a colored point cloud representing the geometry and colors of 3D objects onto the surfaces in the 3D environment, for example onto the faces of a cube encompassing the 3D objects, to obtain videos on texture and depth, and code the texture and depth videos using a legacy encoder such as 3D-HEVC (an extension of HEVC whose specification is found at the ITU website, T recommendation, H series, h265, http://www.itu.int/rec/T-REC-H.265-201612-I/en annex G and I).

At the decoder, the picture and depth images (a video is a sequence of images) are inverse projected to re-generate a colored point cloud (or a sequence of colored point clouds). The inverse projection is performed according to information representing the projections mapping associated to surfaces onto which the original colored point cloud has been projected. The representation of the geometry and color of a point cloud with projection images introduce imprecisions on the point coordinates and color because of the avoidable discretization due to the images rasterization and the non-lossless compression methods. In addition, a same point of the original colored point cloud may be projected several times onto several images through several surfaces. When re-generating the colored point cloud from these images, a same point in the original colored point cloud may be inverse projected several times at close coordinates with distinct colors. This situation uselessly makes the decoded colored point cloud more complex than the original.

Existing methods, when estimated that several inverse projected points from distinct projection images have to be considered as the same original point, set a color for this point that is the average or the median of the color of corresponding pixels in the texture images. This create fuzziness and visual artefacts when rendering the reconstructed colored point cloud. There is a lack for a method for attributing the color of the most appropriated pixel to a point reconstructed according to several projections in several depth and texture images.

3. SUMMARY

The following presents a simplified summary of the present principles to provide a basic understanding of some aspects of the present principles. This summary is not an extensive overview of the present principles. It is not intended to identify key or critical elements of the present principles. The following summary merely presents some aspects of the present principles in a simplified form as a prelude to the more detailed description provided below.

The present principles relate to a method of decoding a color point cloud from a stream. The method generates a three-dimensional colored point cloud and comprises:

obtaining a first image and a second image. The first and the second images encodes a projection of an original three-dimensional colored point cloud. Pixels of the first and the second images comprise a depth attribute and a color attribute;

inverse projecting pixels of the first image and inverse projecting pixels to the second image. When the inverse projecting of a first pixel of the first image and the inverse projecting of a second pixel of the second image refer to a common generated point, attributing to said generated point, the color value of the pixel of first and second pixels having the lowest local depth variance. the local depth variance is computed for a region of n×n pixels around the first and the second pixels n being an integer greater than or equal to three. According to a particular characteristic, the inverse projection of a pixel of an image is a three-dimension volume determined according to a definition of the image and to an imprecision value. A first inverse projection of a first pixel of a first image and a second inverse projection of a second pixel of a second image refer to a common generated point if a percentage of overlapping of the volume of the first inverse projection and the volume of the second inverse projection is bigger than a threshold or if a center to the volume of the first inverse projection belongs to the volume of the second inverse projection and a center of the volume of the second inverse projection belongs to the volume of the first inverse projection.

According to a particular characteristic, depth attributes and color attributes of the first and/or the second image are stored in a pair of one depth image and one texture image. The first and the second images may be decoded from a received bitstream.

The present principles also relate to a device for generating a three-dimensional colored point cloud. The device comprising a memory associated with at least one processor configured to:

obtain a first image and a second image, the first and the second images encoding a projection of an original three-dimensional colored point cloud, pixels of the first and the second images comprising a depth attribute and a color attribute;

inverse project pixels of said first image and inverse project pixels to said second image wherein, when the inverse projecting of a first pixel of the first image and the inverse projecting of a second pixel of the second image refer to a common generated point, attributing to said generated point, the color value of the pixel of first and second pixels having the lowest local depth variance.

The present principles also relate to a non-transitory processor readable medium having stored therein instructions for causing a processor to perform the method of generating a three-dimensional colored point cloud. The method comprises:

obtaining a first image and a second image. The first and the second images encodes a projection of an original three-dimensional colored point cloud. Pixels of the first and the second images comprise a depth attribute and a color attribute;

inverse projecting pixels of the first image and inverse projecting pixels to the second image. When the inverse projecting of a first pixel of the first image and the inverse projecting of a second pixel of the second image refer to a common generated point, attributing to said generated point, the color value of the pixel of first and second pixels having the lowest local depth variance.

4. BRIEF DESCRIPTION OF DRAWINGS

The present disclosure will be better understood, and other specific features and advantages will emerge upon reading the following description, the description making reference to the annexed drawings wherein.

Figure 5:
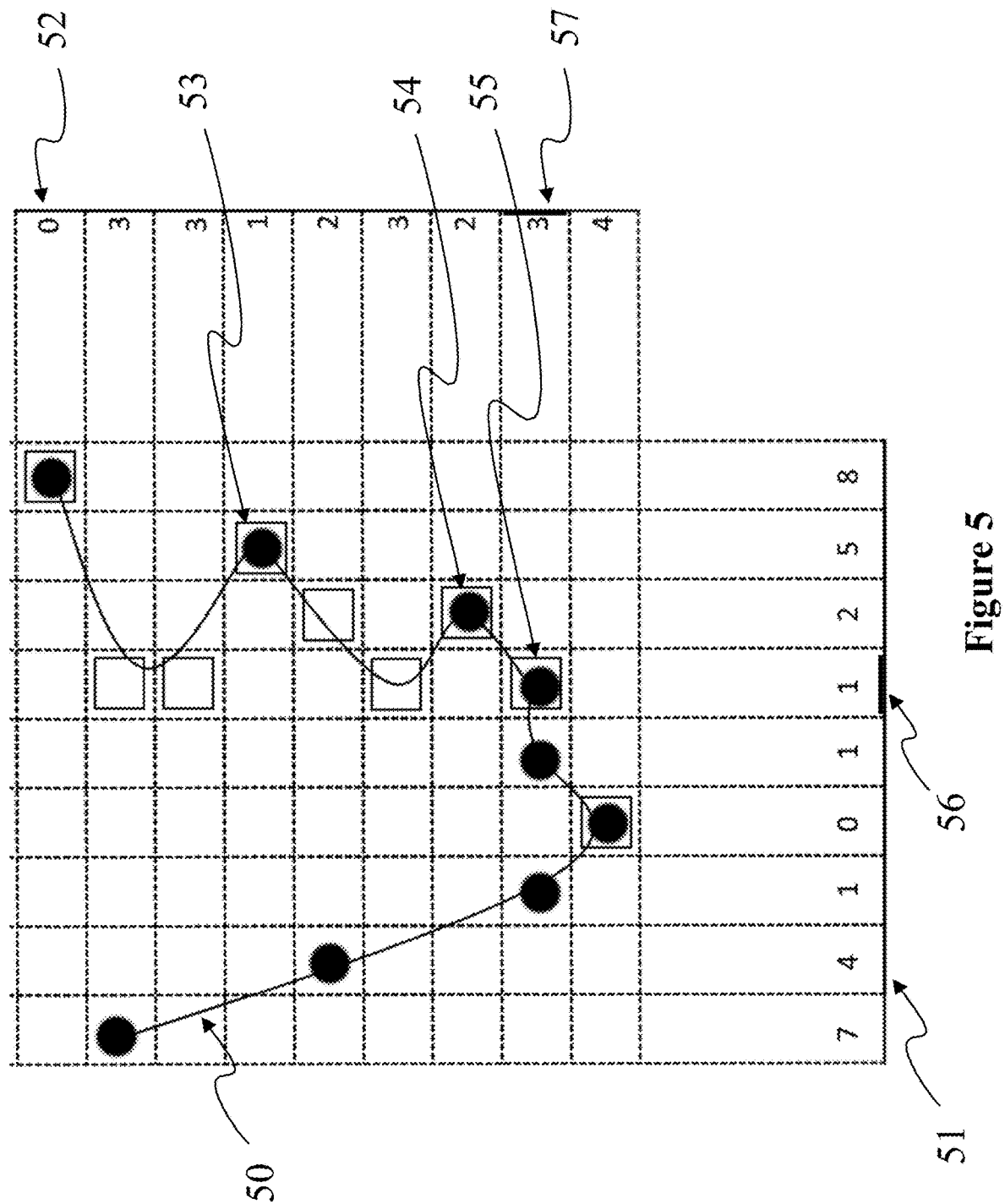
Figure 7:
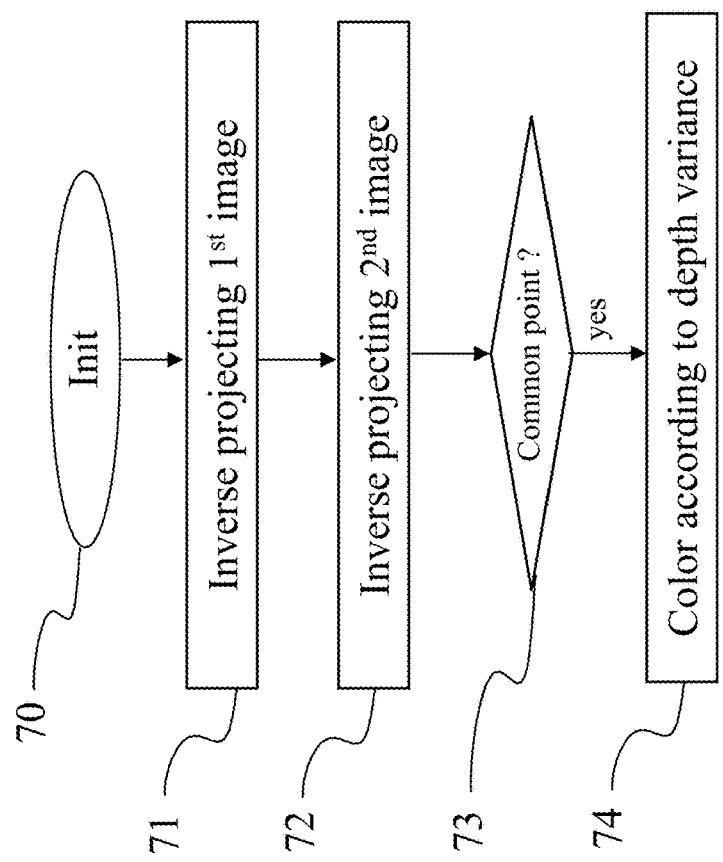
Figure 6:
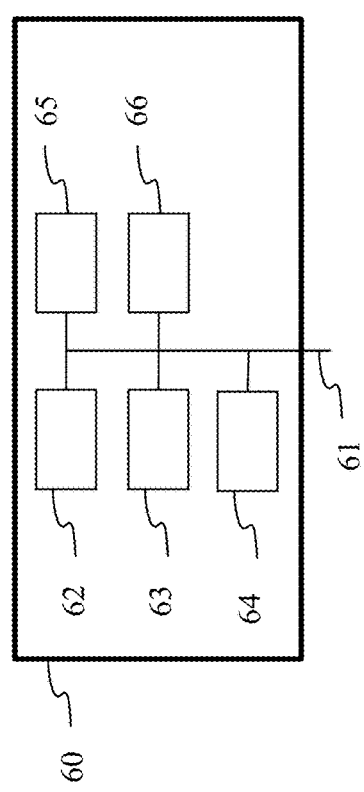

FIG. 5 diagrammatically shows the inverse projection of pixels of two projection surfaces associated with two depth and texture images, according to a non-restrictive embodiment of the present principles;

FIG. 6 represents an exemplary architecture of a device which may be configured to implement a method described in relation with FIG. 7, according to a non-restrictive embodiment of the present principles;

FIG. 7 diagrammatically illustrates a method for encoding a three-dimensional point cloud in a stream by a device of FIG. 6, according to a non-restrictive embodiment of the present principles.

5. DETAILED DESCRIPTION OF EMBODIMENTS

The present principles will be described more fully hereinafter with reference to the accompanying figures, in which examples of the present principles are shown. The present principles may, however, be embodied in many alternate forms and should not be construed as limited to the examples set forth herein. Accordingly, while the present principles are susceptible to various modifications and alternative forms, specific examples thereof are shown by way of examples in the drawings and will herein be described in detail. It should be understood, however, that there is no intent to limit the present principles to the particular forms disclosed, but on the contrary, the disclosure is to cover all modifications, equivalents, and alternatives falling within the spirit and scope of the present principles as defined by the claims.

The terminology used herein is for the purpose of describing particular examples only and is not intended to be limiting of the present principles. As used herein, the singular forms "a", "an" and "the" are intended to include the plural forms as well, unless the context clearly indicates otherwise. It will be further understood that the terms "comprises", "comprising," "includes" and/or "including" when used in this specification, specify the presence of stated features, integers, steps, operations, elements, and/or components but do not preclude the presence or addition of one or more other features, integers, steps, operations, elements, components, and/or groups thereof. Moreover, when an element is referred to as being "responsive" or "connected" to another element, it can be directly responsive or connected to the other element, or intervening elements may be present. In contrast, when an element is referred to as being "directly responsive" or "directly connected" to other element, there are no intervening elements present. As used herein the term "and/or" includes any and all combinations of one or more of the associated listed items and may be abbreviated as"/".

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element without departing from the teachings of the present principles.

Although some of the diagrams include arrows on communication paths to show a primary direction of communication, it is to be understood that communication may occur in the opposite direction to the depicted arrows.

Some examples are described with regard to block diagrams and operational flowcharts in which each block represents a circuit element, module, or portion of code which comprises one or more executable instructions for implementing the specified logical function(s). It should also be noted that in other implementations, the function(s) noted in the blocks may occur out of the order noted. For example, two blocks shown in succession may, in fact, be executed substantially concurrently or the blocks may sometimes be executed in the reverse order, depending on the functionality involved.

Reference herein to "in accordance with an example" or "in an example" means that a particular feature, structure, or characteristic described in connection with the example can be included in at least one implementation of the present principles. The appearances of the phrase in accordance with an example" or "in an example" in various places in the specification are not necessarily all referring to the same example, nor are separate or alternative examples necessarily mutually exclusive of other examples.

Reference numerals appearing in the claims are by way of illustration only and shall have no limiting effect on the scope of the claims. While not explicitly described, the present examples and variants may be employed in any combination or sub-combination.

The present principles are described for encoding/decoding a point cloud but extends to the encoding/decoding of a sequence of point clouds because each colored point cloud of the sequence is sequentially encoded/decoded as described below. Point clouds may be colored.

In the following, an image or a map contains one or several arrays of samples (pixel values) in a specific image/video format which specifies all information relative to the pixel values of an image (or a video) and all information which may be used by a display and/or any other device to visualize and/or decode an image (or video) for example. An image comprises at least one component, in the shape of a first array of samples, usually a luminance component or a depth component, and, possibly, at least one other component, in the shape of at least one other array of samples, usually a color component. Or, equivalently, the same information may also be represented by a set of arrays of color samples, such as the traditional tri-chromatic RGB representation.

A pixel value is represented by a vector of nv values, where nv is the number of components. Each value of a vector is represented with a number of bits which defines a maximal dynamic range of the pixel values. A pixel may comprise components representing a color, a depth or both, for example in a RGB-D format. A texture image, also called texture map, color image or color map is an image whose pixel values represents colors of 3D points and a depth image, also called depth map, is an image whose pixel values depths of 3D points. Usually, a depth image is a grey levels image.

According to the present principles, a colored three-dimensional point cloud is encoded in at least two depth and texture images. The proposed method and device inverse project pixels of the first image and inverse project pixels to the second image. When the inverse projecting of a first pixel of the first image and the inverse projecting of a second pixel of the second image refer to a common generated point, that is two 3D points closer to each other than the imprecision due to the encoding and compression of the images, the color value of the pixel of first and second pixels having the lowest local depth variance is attributed to the common generated point. Coordinates of the unique 3D point generated by the inverse projection of the first and the second pixel are computed according to depth values stored in both pixels and the related imprecision.

Figure 1:
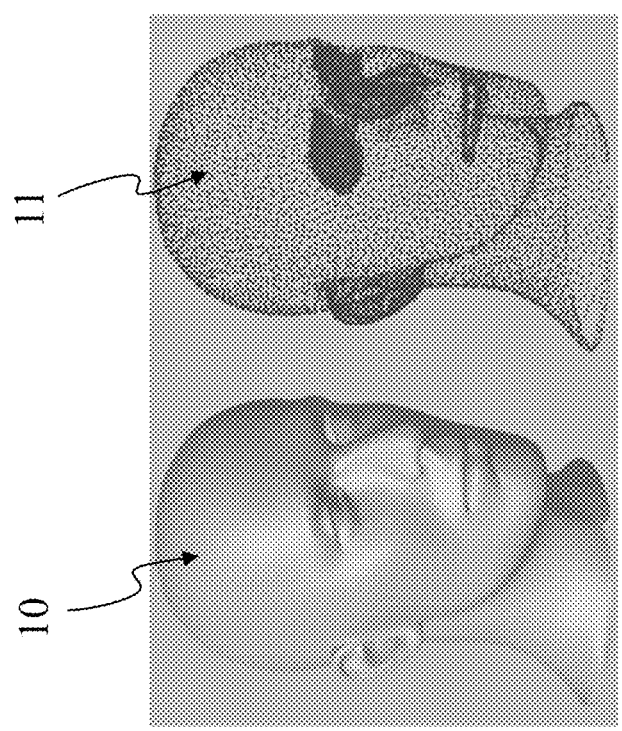
FIG. 1 shows a three-dimensional model of an object and points of a point cloud corresponding to the 3D model, according to a non-restrictive embodiment of the present principles.

FIG. 1 shows a three-dimension (3D) model of an object 10 and points of a point cloud 11 corresponding to 3D model 10. Model 10 may be a 3D mesh representation and points of point cloud 11 may be the vertices of the mesh. Points 11 may also be points spread on the surface of the faces of the mesh. Model 10 may also be represented as a splatted version of point of cloud 11; that is the surface of model 10 is created by splatting the point of point of cloud 11. Model 10 may also be represented by many different representations such as voxels or splines. FIG. 1 illustrates that it is always possible to define a point cloud from a surface representation of a 3D object. Reciprocally it is always possible to create a surface representation of a 3D object from a point of cloud. As used herein, projecting points of a 3D object (by extension points of a 3D scene) to an image is equivalent to projecting any representation of this 3D object to an image.

Figure 2:
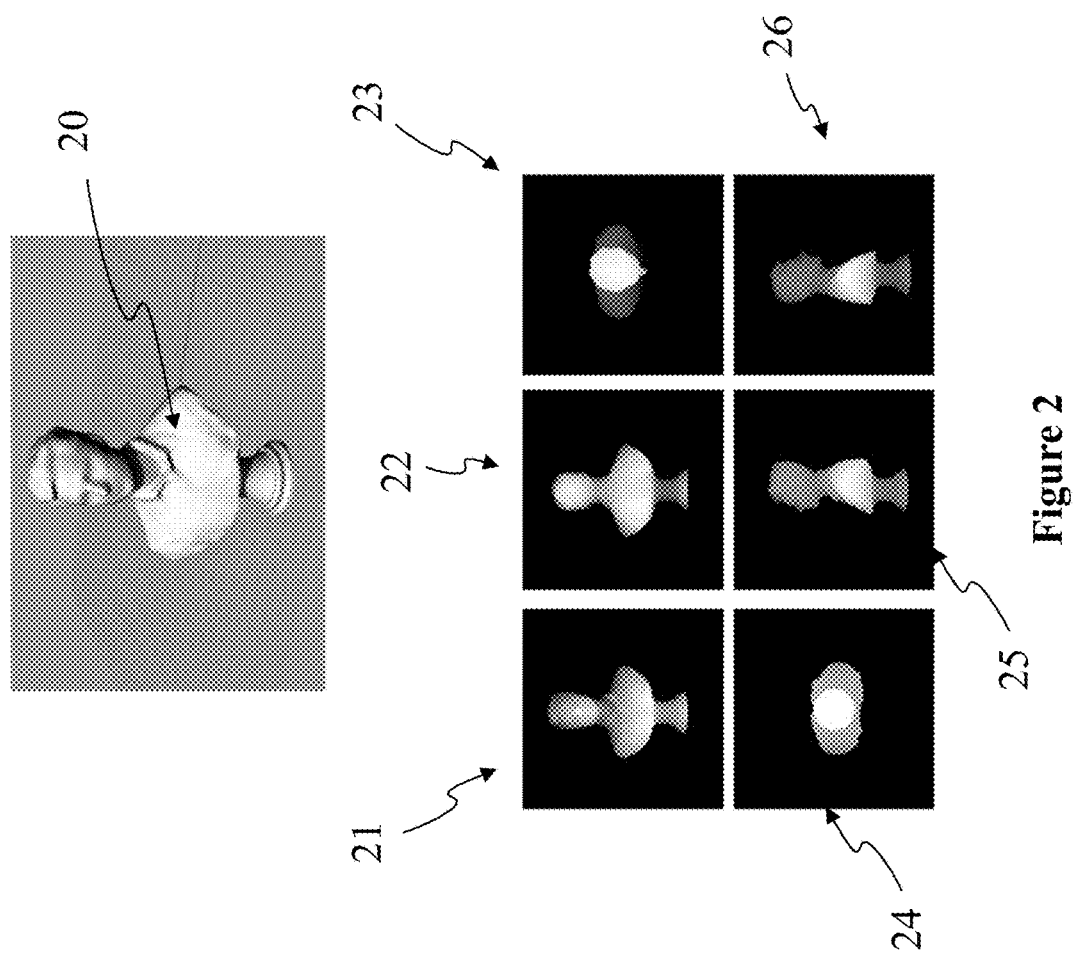
FIG. 2 shows a 3D model, like in FIG. 1, of a bust of a character orthogonally projected onto the six faces of an encompassing cube, according to a non-restrictive embodiment of the present principles.

FIG. 2 shows a 3D model 20 of a bust of a character orthogonally projected onto the six faces of an encompassing cube. For illustration, the 3D model 20 is colorless and only the depth information is stored in images 21 to 26 corresponding to the six faces of the cube. When projecting a colored point cloud onto an image, the color attribute of points is stored in the image pixels, for example in a RGB-D format. In another embodiment, 3D points are projected onto a pair of images, one depth image and one texture image. The orthogonal projection projects 3D points included in the cube onto one of its face to create a depth image per face. The resolution of the created depth images may be identical to the cube resolution, for instance points in a 16×16×16 cube are projected onto six 16×16 pixel images. By permutation of the axes, one may assume without loss of generality that a face is parallel to the XY plane. Consequently, the depth (i.e. the distance between a point and the face of projection) of a point is obtained by the component Z of the position of the point when the depth value Zface of the face equals 0 or by the difference between the component Z and the depth value Zface of the face. For each point at position (X,Y,Z), if the distance Z-Zface from the point to the face is strictly lower than the depth value of the collocated (in the sense of same X and same Y) pixel in the depth image, then said depth value is replaced by Z-Zface and the color of the collocated pixel the texture image is replaced by the color of said point. After the projection is performed for all points, all depth values of the depth image may be shifted by an offset +D. Practically, the value Zface, the origin for X and Y for the face, as well as the cube position relatively to the face, are obtained from the projection information data. The offset D is used to discriminate pixels of the images that have been projected (depth is strictly positive) or not (depth is zero). The projection process is not limited to the above described process that is provided as an exemplary embodiment only.

On the example of FIG. 2, the lowest value of the depth dynamic range (i.e. in black color corresponding to depth value zero) is used as a predetermined value indicating that no 3D point has been projected onto the pixel. The brighter the pixel, the closer the point to the face of projection. The maximal value of the depth dynamic range is attributed to the closest distance between a point and the face. The depth dynamic range may be encoded on n bits (i.e. in a range from 0 to $2^n-1$), for instance n=8 (i.e. max value=255) or 12 bits (i.e. max value=2047). Depth may be encoded according to a linear scale or, for example, according to a logarithmic scale as a depth value imprecision for a point far from the point of view is less important than a depth value imprecision for a point close to the point of view.

A projection of points of a 3D model onto an image projects points of the model orthogonally visible from the face. Only the closest points on the Z axis are projected onto the image. For example, on image 21 corresponds to the front view of the 3D model 20. Points at the back of the bust 20 are not projected in pixels of image 21 because they are masked. The projection onto image 22 corresponds to the back view of the model 20. A part of points of the point cloud 20 which were not visible from the front view are projected in image 22. Some points of the 3D model 20 are still not projected on image 21 and 22. In order to minimize the number of points which are not projected, additional projections are performed on other faces. In the example of FIG. 2, the six surfaces are structured as a cube encompassing the 3D model 20. The present principles are not limited to a cubical structure of the projection faces. Even with the six images of the six projections of FIG. 2, some points of the point cloud 20 (i.e. the 3D model 20) may be not represented, for example points of the top of the column bearing the bust. On the contrary, some points are projected several times. For instance, points of the nose of the character may be projected onto images 21, 23, 25 and/or 26 from which the nose is visible. That is a point of the nose is projected up to four times onto the six images and may be encoded several times into the bitstream comprising the six images.

Figure 3:
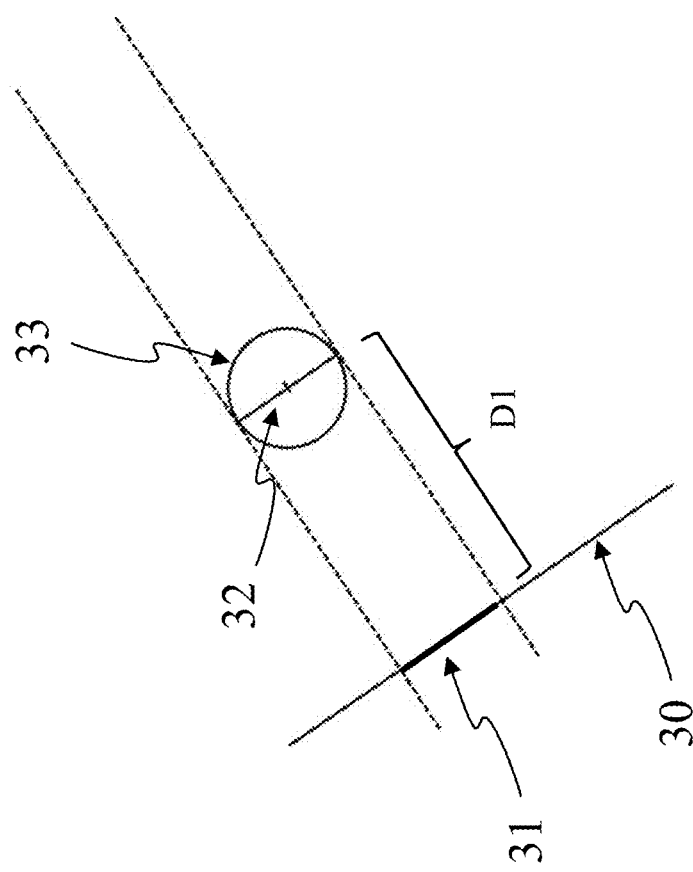
FIG. 3 illustrates the orthogonal inverse projecting of a pixel of an image, according to a non-restrictive embodiment of the present principles.

FIG. 3 illustrates the orthogonal inverse projecting of pixel 31 of a first image 30. For the sake of clarity, FIG. 3 illustrates the inverse projection in two dimensions. It is understood that the same principles apply without loss of generality to three dimensions. A pixel of image 30 stores a depth value D1. Due to the rasterization, a pixel is not punctual, it has a length in two dimensions (usually called width and height). So, the inverse projection of this pixel corresponds to a rectangle 32 in the 3D space, orthogonally located at a distance D1 from the pixel of surface in the 3D space of the image 30. Due to value discretization of value representation and compression of the image (e.g. depth dynamics range and/or quantification), depth D1 stored in the pixel is imprecise. So, the inversion projection to the pixels corresponds to a volume in the 3D space illustrated as a sphere 33 in FIG. 3. The imprecision volume of coordinates of the inverse projection of a pixel may have different shapes according to the estimation of the imprecision. For example, volume 33 may be an ellipsoid, a parallelepiped or a frustum centered on surface 32 (or not centered on surface 32 as the imprecision may depend on depth D. At the decoding, inversion projection of pixel 31 indicates that coordinates of the 3D point of the original point cloud projected onto pixel 31 belong to volume 33. Pixel 31 also stores a color value, this color value being imprecise for the same reasons than the depth value. This color value is attributed to the inverse projection of pixel 31.

Figure 4:
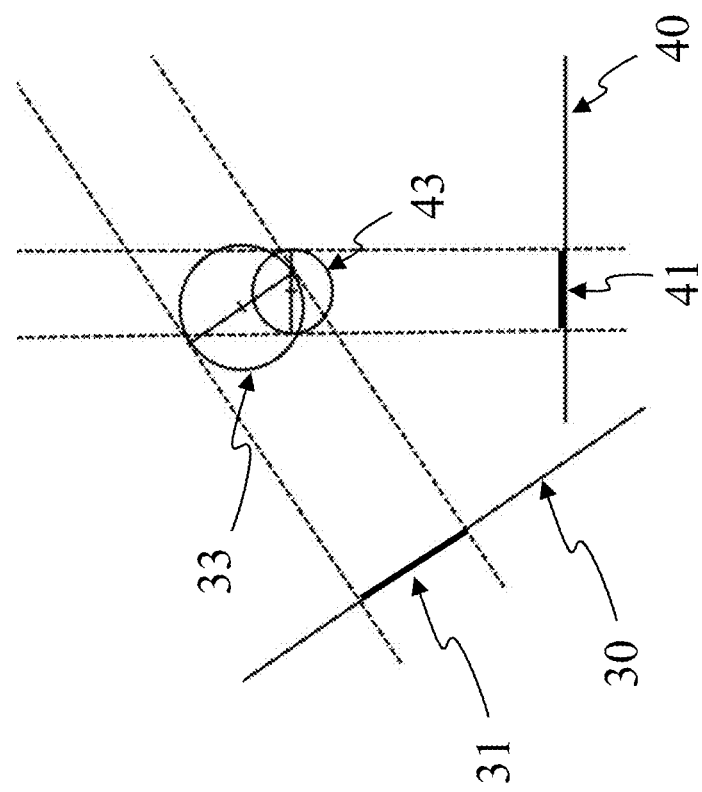
FIG. 4 illustrates the inverse projection of a first pixel of the first image of FIG. 3 and of a second pixel of a second image, according to a non-restrictive embodiment of the present principles.

FIG. 4 illustrates the inverse projection of a first pixel 31 of a first image 30 and of a second pixel 41 of a second image 40. The resolution of image 40 may be different from the resolution of image 30. So, width and height of pixels of image 40 may be different from the width and height of pixels of image 30. The inverse projection of a pixel 41 of image 40 corresponds to a volume 43 to which coordinates of the inverse projected point belongs. Pixel 41 also stores a color value. This color value is attributed to the inverse projection of pixel 41.

As a same 3D point of the original point may be projected several times onto distinct images, it is necessary to evaluate whether the inverse projections of two pixels 31 and 41 of distinct images 30 and 40 refer to a same point of the original 3D point cloud. In this case, the two inverse projections may be merged and generate a unique 3D point of the reconstructed point cloud. This evaluation may be computed, for instance, according to the percentage of overlapping of volume 33 and volume 43. If the percentage of overlapping of the volumes is bigger than a threshold, for example 50% or 75%, then the inverse projections refer to a common generated point. In a variant, the evaluation may be determined according to whether the center of volume 33 belongs to volume 43 and/or reciprocally. When two inverse projections 33 and 43 for two pixels 31 and 41 of distinct images 30 and 40 are evaluated referring to a same point of the original 3D point cloud, coordinates of the point generated for these two inverse projections may be a vector average of the coordinates of centers of volumes 33 and 43. In a variant, coordinates of the inverse projection with the lowest imprecision value is attributed to the generated point.

When two inverse projections 33 and 43 for two pixels 31 and 41 of distinct images 30 and 40 are evaluated referring to a same point of the original 3D point cloud, the question of the color value to attribute to the generated point is posed. A possible solution is to attribute to the generated point an average value of the color value of pixel 31 and pixel 41. Such a solution introduces fuzziness and visual artefacts when visualizing the generated colored point cloud, especially on sharp edges of the 3D model. According to the present principles, it is advantageous to attribute one of the colors stored in pixel 31 or 41 to the generated point according to the local curvature or to the local variance of the 3D model's surface at this point.

FIG. 5 diagrammatically shows the inverse projection of pixels of two projection surfaces 51 and 52 associated with two depth and texture images. In FIG. 5, depth value stored in pixels of images respectively associated with projection surface 51 and 52 are indicated as integers in columns and rows in front of illustrated pixels. A first set of 3D points generated by the inverse projection of pixels of image 51 are shown as black discs. A second set of 3D points generated by the inverse projection of pixels of image 52 are shown as empty squares. For example, inverse projection pf pixel 56 if image 51 (with depth=1) and pixel 57 of image 52 (with depth=3) refer to a same generated point 55. Points of the original point cloud are located along surface 50 and projected on surfaces associated with images 51 and 52. Depth and color information about points of the original point cloud is stored in pixels of image 51 and 52. Some points are projected twice, like points 53, 54 and 55.

For several pairs of pixels, one for first image 51, one for second image 52, inverse projection is evaluated as referring to a common 3D reconstructed point, for example points 53, 54 and 55. For these reconstructed points, a color has to be attributed according to values stored in pixels. Point 55 is generated from the inverse projection of pixels 56 and 57. According to the present principles, the local curvature of the generated point cloud is evaluated for both images 51 and 52 at pixels 56 and 57. The local curvature may be estimated from depth information encoded in the images by any suitable method. According to the present principles, the color attributed to the generated pixel is the color stored in the pixel having the flattest local curvature of the surface. In another embodiment, the variance of the depth is computed for region of n×n pixels around the considered pixel (e.g. n=3 or n=5), n being an integer greater than or equal to three.

In the example of FIG. 5, n equals 3. The depth variance for pixel 56 of image 51 is 2/9≈0.222. The depth variance for pixel 57 vaults 6/9≈0.666. According to the present principles, the color attributed to the generated pixel is the color stored in the pixel for which the variance is the lowest. According to the present principles, the color of pixel 56 is attributed to point 57; color of pixel 57 is not used. Computing the local variance of the depth of pixels of an image has the advantage to be easy and fast to compute, for example by a GPU in a shader microprogram. A low variance indicates that depth values of the contiguous pixels are close to their average depth value and, so, that the 3D point cloud surface at this location is paralleled to the projection surface. The 3D points are assumed to be close in the 3D space. Texture of the 3d model at this location is more likely to be homogeneous and leading to low frequency of the color attributes at the corresponding location in the projection image, leading to a good of precision conservation when compressing and decompressing the texture image. On the contrary, a high variance indicates that points projected onto the n×n pixels do not belong to a plane parallel to the projection surface and two close pixels in the projection image are far from each other in the 3D space. Texture of the 3d model at this location is less likely to be, leading to a loss of precision when compressing and decompressing the texture image.

FIG. 6 represents an exemplary architecture of a device 60 which may be configured to implement a method described in relation with FIG. 7. Device 60 comprises following elements that are linked together by a data and address bus 61:
  a microprocessor 62 (or CPU), which is, for example, a DSP (or Digital Signal Processor);
  a ROM (or Read Only Memory) 63;
  a RAM (or Random Access Memory) 64;
  an I/O interface 65 for reception of data to transmit, from an application; and
  an optional battery 66.

In accordance with an example, the battery 66 is external to the device. In each of mentioned memory, the word «register» used in the specification can correspond to area of small capacity (some bits) or to very large area (e.g. a whole program or large amount of received or decoded data). The ROM 63 comprises at least a program and parameters. The ROM 63 may store algorithms and instructions to perform techniques in accordance with present principles. When switched on, the CPU 62 uploads the program in the RAM and executes the corresponding instructions.

RAM 64 comprises, in a register, the program executed by the CPU 62 and uploaded after switch-on of the device 60, input data in a register, intermediate data in different states of the method in a register, and other variables used for the execution of the method in a register.

The implementations described herein may be implemented in, for example, a method or a process, an apparatus, a software program, a data stream, or a signal. Even if only discussed in the context of a single form of implementation (for example, discussed only as a method or a device), the implementation of features discussed may also be implemented in other forms (for example a program). An apparatus may be implemented in, for example, appropriate hardware, software, and firmware. The methods may be implemented in, for example, an apparatus such as, for example, a processor, which refers to processing devices in general, including, for example, a computer, a microprocessor, an integrated circuit, or a programmable logic device. Processors also include communication devices, such as, for example, computers, cell phones, portable/personal digital assistants ("PDAs"), and other devices that facilitate communication of information between end-users.

In accordance with an example of the decoding or a decoder, the reconstructed point cloud is sent to a destination; specifically, the destination belongs to a set comprising:
  a local memory 63 or 64, e.g. a video memory or a RAM, a flash memory, a hard disk;
  a storage interface 65, e.g. an interface with a mass storage, a RAM, a flash memory, a ROM, an optical disc or a magnetic support;
  a communication interface 65, e.g. a wireline interface (for example a bus interface (e.g. USB (or Universal Serial Bus)), a wide area network interface, a local area network interface, a HDMI (High Definition Multimedia Interface) interface) or a wireless interface (such as a IEEE 802.11 interface, WiFi® or a Bluetooth® interface);
  a rendering device; and
  a display.

In accordance with examples of decoding or decoder, a bitstream encoded a first and a second image is obtained from a source. Exemplarily, a bitstream is read from a local memory, e.g. a video memory 64, a RAM 64, a ROM 63, a flash memory 63 or a hard disk 63. In a variant, the bitstream is received from a storage interface 65, e.g. an interface with a mass storage, a RAM, a ROM, a flash memory, an optical disc or a magnetic support and/or received from a communication interface 65, e.g. an interface to a point to point link, a bus, a point to multipoint link or a broadcast network.

In accordance with examples, device 60 being configured to implement a decoding method described in relation with FIG. 7, belongs to a set comprising:
  a mobile device;
  a Head Mounted Display (HMD)
  (mixed reality) smartglasses
  an holographic device
  a communication device;
  a game device;
  a set top box;
  a TV set;
  a tablet (or tablet computer);
  a laptop;
  a display
  a stereoscopic display and
  a decoding chip.

FIG. 7 diagrammatically illustrates a method for encoding a three-dimensional point cloud in a stream by a device 60 of FIG. 6, according to a non-restrictive embodiment of the present principles.

In a step 70, the different parameters of the device 60 are updated. In particular, the 3D a first image and a second image comprising depth and color attributes are obtained from a source, projection mappings are initialized and sizes and resolutions of the first and the second images are determined.

In a step 71, pixels of the first image are inverse projected according to a projection mapping associated with the first image. The inverse projection generates 3D points of the reconstructed point cloud. The inverse projection of a pixel is a 3D volume determined according to the definition of the first image (i.e. the size of pixels of the first image on the corresponding 3D surface in the 3D space) and an imprecision value determined according to parameters of the compression method used for encoding the first image. The color stored in pixels of the first image is attributed to corresponding generated points.

In a step 72, pixels of the second image are inverse projected according to a projection mapping associated with the second image. In a step 73, a test is performed to determine if the inverse projection of a second pixel of the second image refer to a point generated by the inverse projection of a first pixel of the first image, called common generated point. If the two inverse projections refer to a common generated point a step 74 is performed. Otherwise, the color of the second pixel is attributed to the generated 3D point. The inverse projection of the second pixel and the inverse projection of the first pixel refer to a common generated point if their associated volume overlap over a percentage threshold, for example 50% or 75%. In a variant, the two inverse projections refer to a common generated point if the center of the volume of the inverse projection of the first pixel belongs to the volume of the inverse projection of the second pixel and reciprocally.

In a step 74, the local variance of the depth is evaluated for the first pixel and the second pixel. The color of the pixel having the lowest depth variance is attributed to the common generated point. Coordinates of the common generated point are computed to the two volumes of the two inverse projections.

Naturally, the present disclosure is not limited to the embodiments previously described. In particular, the present disclosure is not limited to methods and devices for decoding a stream carrying data representative of a three-dimensional point cloud (or a sequence of three-dimensional point clouds) but also extends to methods of rendering the retrieved point cloud (or sequence of point clouds) to any devices implementing these methods and notably any devices comprising at least one CPU and/or at least one GPU. The present disclosure also relates to a method (and a device configured) for transmitting and/or receiving the stream encoded according to the present principles.

The implementations described herein may be implemented in, for example, a method or a process, an apparatus, a computer program product, a data stream, or a signal. Even if only discussed in the context of a single form of implementation (for example, discussed only as a method or a device), the implementation of features discussed may also be implemented in other forms (for example a program). An apparatus may be implemented in, for example, appropriate hardware, software, and firmware. The methods may be implemented in, for example, an apparatus such as, for example, a processor, which refers to processing devices in general, including, for example, a computer, a microprocessor, an integrated circuit, or a programmable logic device. Processors also include communication devices, such as, for example, Smartphones, tablets, computers, mobile phones, portable/personal digital assistants ("PDAs"), and other devices that facilitate communication of information between end-users.

Implementations of the various processes and features described herein may be embodied in a variety of different equipment or applications, particularly, for example, equipment or applications associated with data encoding, data decoding, view generation, texture processing, and other processing of images and related texture information and/or depth information. Examples of such equipment include an encoder, a decoder, a post-processor processing output from a decoder, a pre-processor providing input to an encoder, a video coder, a video decoder, a video codec, a web server, a set-top box, a laptop, a personal computer, a cell phone, a PDA, and other communication devices. As should be clear, the equipment may be mobile and even installed in a mobile vehicle.

Additionally, the methods may be implemented by instructions being performed by a processor, and such instructions (and/or data values produced by an implementation) may be stored on a processor-readable medium such as, for example, an integrated circuit, a software carrier or other storage device such as, for example, a hard disk, a compact diskette ("CD"), an optical disc (such as, for example, a DVD, often referred to as a digital versatile disc or a digital video disc), a random access memory ("RAM"), or a read-only memory ("ROM"). The instructions may form an application program tangibly embodied on a processor-readable medium. Instructions may be, for example, in hardware, firmware, software, or a combination. Instructions may be found in, for example, an operating system, a separate application, or a combination of the two. A processor may be characterized, therefore, as, for example, both a device configured to carry out a process and a device that includes a processor-readable medium (such as a storage device) having instructions for carrying out a process. Further, a processor-readable medium may store, in addition to or in lieu of instructions, data values produced by an implementation.

As will be evident to one of skill in the art, implementations may produce a variety of signals formatted to carry information that may be, for example, stored or transmitted. The information may include, for example, instructions for performing a method, or data produced by one of the described implementations. For example, a signal may be formatted to carry as data the rules for writing or reading the syntax of a described embodiment, or to carry as data the actual syntax-values written by a described embodiment. Such a signal may be formatted, for example, as an electromagnetic wave (for example, using a radio frequency portion of spectrum) or as a baseband signal. The formatting may include, for example, encoding a data stream and modulating a carrier with the encoded data stream. The information that the signal carries may be, for example, analog or digital information. The signal may be transmitted over a variety of different wired or wireless links, as is known. The signal may be stored on a processor-readable medium.

A number of implementations have been described. Nevertheless, it will be understood that various modifications may be made. For example, elements of different implementations may be combined, supplemented, modified, or removed to produce other implementations. Additionally, one of ordinary skill will understand that other structures and processes may be substituted for those disclosed and the resulting implementations will perform at least substantially the same function(s), in at least substantially the same way(s), to achieve at least substantially the same result(s) as the implementations disclosed. Accordingly, these and other implementations are contemplated by this application.

The invention claimed is:

1. A method of generating a three-dimensional colored point cloud, the method comprising:
    obtaining a first image and a second image, the first and second images encoding a projection of an original three-dimensional colored point cloud, pixels of the first and second images comprising a depth attribute and a color attribute;
    inverse projecting pixels of the first image and inverse projecting pixels of the second image; and
    determining that the inverse projecting of a first pixel of the first image and the inverse projecting of a second pixel of the second image refer to a common generated point, and responsively attributing a color value to the common generated point by selecting a color value associated with one of the first pixel and the second pixel, wherein the associated pixel has a lowest local depth variance of the first pixel and the second pixel, wherein the local depth variance of a given pixel is computed for a region of n×n pixels around the given pixel, with n being an integer greater than or equal to three.

2. The method according to claim 1, wherein the inverse projection of a pixel of an image is a three-dimension volume determined according to a resolution of the image in 3D space and to an imprecision value on the depth attribute of the pixel.

3. The method according to claim 2, wherein determining that the first inverse projection of the first pixel and the second inverse projection of the second pixel refer to a common generated point comprises determining that a percentage of overlap of a volume of the first inverse projection and a volume of the second inverse projection is bigger than a threshold.

4. The method according to claim 2, wherein determining that the first inverse projection of the first pixel and the second inverse projection of the second pixel refer to a common generated point comprises determining that a center of a volume of the first inverse projection is within a volume of the second inverse projection or that a center of the volume of the second inverse projection is within the volume of the first inverse projection.

5. The method according to claim 1, wherein depth attributes and color attributes of at least one of the first and the second image are stored in a pair of one depth image and one texture image.

6. The method according to claim 1, comprising decoding the first and second images from a received bitstream.

7. A device for generating a three-dimensional colored point cloud, the device comprising:
    at least one processor; and
    a memory, the memory having stored thereon instructions that are operative, when executed by the at least one processor, to cause the device to:
        obtain a first image and a second image, the first and second images encoding a projection of an original three-dimensional colored point cloud, pixels of the first and second images comprising a depth attribute and a color attribute;
        inverse project pixels of the first image and inverse project pixels of the second image; and
        determine that the inverse projecting of a first pixel of the first image and the inverse projecting of a second pixel of the second image refer to a common generated point, and responsively attribute a color value to the common generated point by selecting a color value associated with one of the first pixel and the second pixel, wherein the associated pixel has a lowest local depth variance of the first pixel and the second pixel, wherein the local depth variance of a given pixel is computed for a region of n×n pixels around the given pixel, with n being an integer greater than or equal to three.

8. The device according to claim 7, wherein the inverse projection of a pixel of an image is a three-dimension volume determined according to a resolution of the image in 3D space and to an imprecision value on the depth attribute of the pixel.

9. The device according to claim 8, wherein determining that the first inverse projection of the first pixel and the second inverse projection of the second pixel refer to a common generated point comprises determining that a percentage of overlap of a volume of the first inverse projection and a volume of the second inverse projection is bigger than a threshold.

10. The device according to claim 8, wherein determining that the first inverse projection of the first pixel and the second inverse projection of the second pixel refer to a common generated point comprises determining that a center of a volume of the first inverse projection is within a volume of the second inverse projection or that a center of the volume of the second inverse projection is within the volume of the first inverse projection.

11. The device according to claim 7, wherein depth attributes and color attributes of at least one of the first and the second image are stored in a pair of one depth image and one texture image.

12. The device according to claim 7, comprising decoding the first and second images from a received bitstream.

13. A non-transitory processor-readable storage medium having stored thereon instructions that are operative, when executed by at least one processor, to cause the at least one processor to:
    obtaining a first image and a second image, the first and second images encoding a projection of an original three-dimensional colored point cloud, pixels of the first and second images comprising a depth attribute and a color attribute;
    inverse projecting pixels of the first image and inverse projecting pixels of the second image; and
    determining that the inverse projecting of a first pixel of the first image and the inverse projecting of a second pixel of the second image refer to a common generated point, and responsively attributing a color value to the common generated point, by selecting a color value associated with one of the first pixel and the second pixel, wherein the associated pixel has a lowest local depth variance of the first pixel and the second pixel, wherein the local depth variance of a given pixel is computed for a region of n×n pixels around the given pixel, with n being an integer greater than or equal to three.

* * * * *